United States Patent
Yoshikawa et al.

(10) Patent No.: US 10,179,520 B2
(45) Date of Patent: Jan. 15, 2019

(54) FUEL CELL VEHICLE

(71) Applicants: TOYOTA JIDOSHA KABUSHIKI KAISHA, Toyota-shi, Aichi-ken (JP); TAIHO KOGYO CO., LTD., Toyota-shi, Aichi-ken (JP)

(72) Inventors: Shigetaka Yoshikawa, Miyoshi (JP); Hiroaki Nishiumi, Toyota (JP); Tatsuya Tokumasu, Toyota (JP)

(73) Assignees: Toyota Jidosha Kabushiki Kaisha, Toyota-shi, Aichi-ken (JP); Taiho Kogyo Co., Ltd., Toyota-shi, Aichi-ken (JP)

( * ) Notice: Subject to any disclaimer, the term of this patent is extended or adjusted under 35 U.S.C. 154(b) by 0 days.

(21) Appl. No.: 15/827,365

(22) Filed: Nov. 30, 2017

(65) Prior Publication Data
US 2018/0170211 A1   Jun. 21, 2018

(30) Foreign Application Priority Data
Dec. 19, 2016   (JP) .................................. 2016-245328

(51) Int. Cl.
*B60L 11/18* (2006.01)
*H01M 8/2475* (2016.01)

(52) U.S. Cl.
CPC ....... *B60L 11/1896* (2013.01); *B60L 11/1892* (2013.01); *B60L 11/1898* (2013.01); *H01M 8/2475* (2013.01); *H01M 2250/20* (2013.01)

(58) Field of Classification Search
CPC .. B60L 11/1896; B60L 11/1898; B62D 21/15; B62D 21/152; B61D 21/155; H01M 8/2475
See application file for complete search history.

(56) References Cited

U.S. PATENT DOCUMENTS

| | | | | |
|---|---|---|---|---|
| 8,616,319 | B2 * | 12/2013 | Yokoyama | B60K 1/04 180/68.5 |
| 9,371,009 | B2 * | 6/2016 | Ishikawa | B62D 21/15 |
| 2004/0090085 | A1 * | 5/2004 | Kawasaki | B60K 1/04 296/187.09 |
| 2015/0027796 | A1 * | 1/2015 | Naito | B60K 1/04 180/65.31 |
| 2015/0251560 | A1 | 9/2015 | Ishikawa et al. | |
| 2017/0066479 | A1 | 3/2017 | Murata | |
| 2017/0096067 | A1 * | 4/2017 | Murata | B60K 1/04 |
| 2017/0096172 | A1 | 4/2017 | Nagaosa | |
| 2018/0178641 | A1 * | 6/2018 | Yamafuji | B60K 1/04 |

FOREIGN PATENT DOCUMENTS

| | | |
|---|---|---|
| JP | 2015168307 A | 9/2015 |
| JP | 2015231319 A | 12/2015 |

* cited by examiner

*Primary Examiner* — Brian L Swenson
(74) *Attorney, Agent, or Firm* — Dickinson Wright, PLLC

(57) ABSTRACT

A fuel cell vehicle comprises a fuel cell module, a vehicle body frame, a plurality of mounting portions and a tank. A front portion of the vehicle body frame that a front side mounting portion is attached to is configured to be movable upward in a vehicle height direction when a load is applied in the vehicle longitudinal direction. A rear side mounting portion configured to mount a rear side of the fuel cell module in the vehicle longitudinal direction to the vehicle body frame is configured to be more easily breakable, compared with the front side mounting portion, when the load is applied in the vehicle longitudinal direction.

8 Claims, 11 Drawing Sheets

(NORMAL STATE)

(IN THE EVENT OF COLLISION)

(IN THE EVENT OF COLLISION)

SECOND EMBODIMENT

THIRD EMBODIMENT

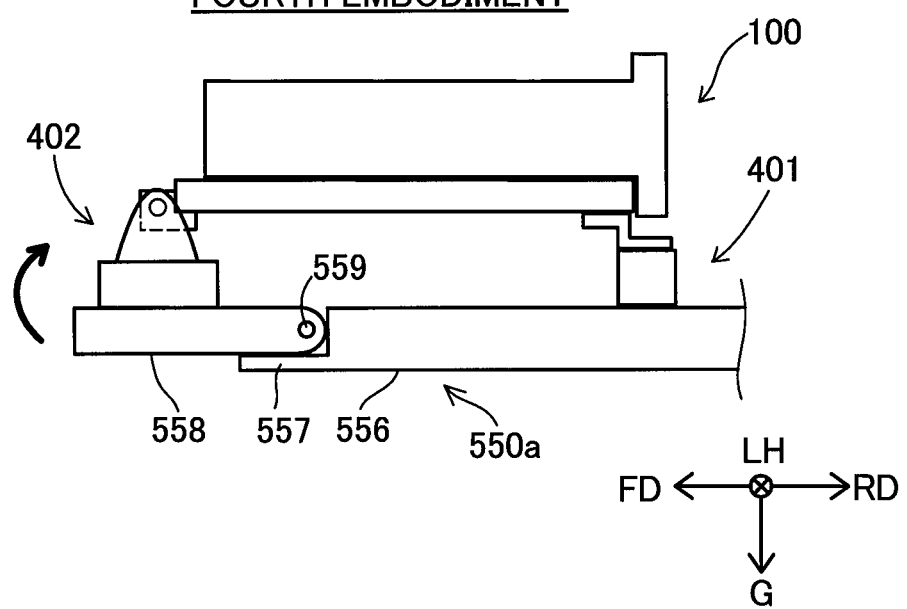

FUEL CELL VEHICLE

CROSS-REFERENCE TO RELATED APPLICATIONS

The present application claims priority to Japanese Patent Application No. 2016-245328, filed Dec. 19, 2016, the disclosure of which is incorporated by reference herein in its entirety.

BACKGROUND

Field

The present disclosure relates to a fuel cell vehicle equipped with a fuel cell.

Related Art

In a proposed configuration of a fuel cell vehicle, a fuel cell module including a fuel cell stack is placed in a placement chamber provided in front of a passenger compartment, and a tank for storing hydrogen gas is placed in a hydrogen tank chamber provided under a floor of the passenger compartment (as described in JP 2015-231319A). In the fuel cell vehicle of JP 2015-231319A, the fuel cell module is mounted to a suspension member via a mounting member. When this mounting member is broken in the event of a collision, a rear side of the fuel cell module moves into a retreat space below the hydrogen tank chamber. The configuration of changing the position and the attitude of the fuel cell module prevents the fuel cell module from colliding with the tank.

In the fuel cell vehicle of JP2015-231319A, when fixation of the tank to the vehicle body frame is released by the impact of a collision and the tank is moved forward by the inertial force, the fuel cell module is likely to collide with the tank. The collision of the fuel cell module with the tank is likely to damage the tank. There is accordingly a need for a technique that suppresses a collision of the fuel cell module with the tank in the event of a collision of the fuel cell vehicle.

SUMMARY

According to one aspect of the disclosure, there is provided a fuel cell vehicle. This fuel cell vehicle may comprise a fuel cell module including a fuel cell stack, a vehicle body frame that the fuel cell module is mounted to, a plurality of mounting portions configured to mount the fuel cell module to the vehicle body frame, the plurality of mounting portions including a front side mounting portion configured to mount a front side of the fuel cell module in a vehicle longitudinal direction of the fuel cell vehicle to the vehicle body frame, and a rear side mounting portion configured to mount a rear side of the fuel cell module in the vehicle longitudinal direction to the vehicle body frame, and a tank placed on a rear side of the fuel cell module in the vehicle longitudinal direction and configured to store a gas that is to be supplied to the fuel cell stack. A front portion of the vehicle body frame that the front side mounting portion is attached to may be configured to be movable upward in a vehicle height direction when a load is applied in the vehicle longitudinal direction. The rear side mounting portion may be configured to be more easily breakable, compared with the front side mounting portion, when the load is applied in the vehicle longitudinal direction.

BRIEF DESCRIPTION OF DRAWINGS

FIG. 11 is a sectional view illustrating a suspension member according to a fourth embodiment.

DESCRIPTION OF EMBODIMENTS

A. First Embodiment

A1. General Configuration of Vehicle

Figure 1:
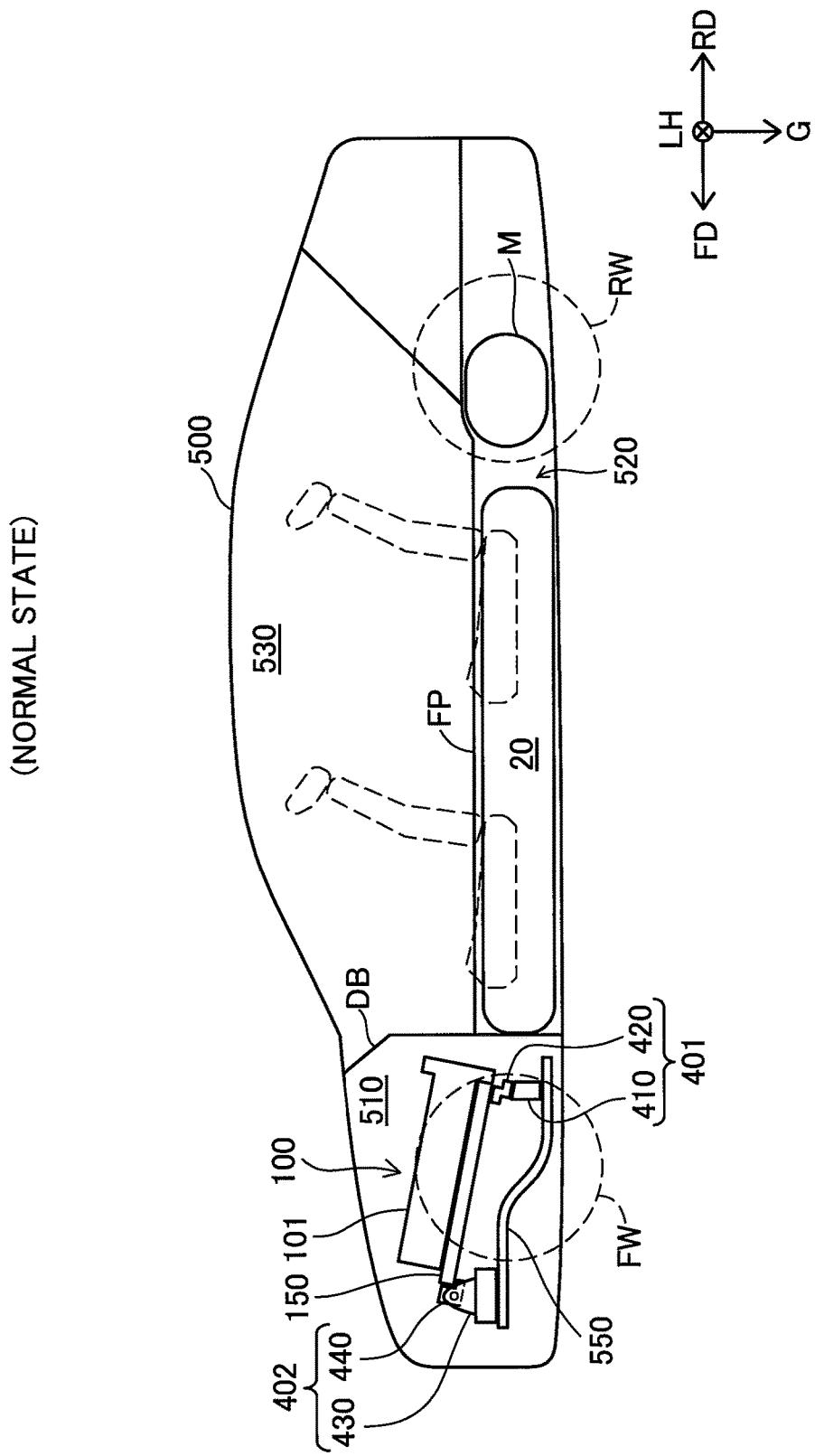
FIG. 1 is a diagram illustrating a sectional view of the schematic configuration of a fuel cell vehicle according to one embodiment of the disclosure.

FIG. 1 is a diagram illustrating a sectional view of the schematic configuration of a fuel cell vehicle 500 according to one embodiment of the disclosure. FIG. 1 illustrates a section along a forward direction FD and a rearward direction RD of the vehicle at the middle position in a vehicle width direction LH of the fuel cell vehicle 500 in a normal state without a collision. According to the embodiment, the forward direction FD and the rearward direction RD are collectively referred as "vehicle longitudinal direction". The fuel cell vehicle 500 is equipped with a fuel cell module 100 as a power source and is configured such that rear wheels RW are driven by driving a motor M as a driving source. The direction of gravity, i.e., a vertically downward direction G, is shown in FIG. 1, in addition to the vehicle width direction LH, the forward direction FD, and the rearward direction RD. The reference signs and arrows indicating the respective directions in FIG. 1 correspond to the reference signs and arrows indicating the respective directions in the other drawings.

The fuel cell vehicle 500 is configured to form a first chamber 510, a second chamber 520 and a third chamber 530. The first chamber 510 is located on a forward direction FD-side in the fuel cell vehicle 500. The second chamber 520 is located on a rearward direction RD-side of the first chamber 510 and on a vertically downward direction G-side in the fuel cell vehicle 500. The third chamber 530 is located on the rearward direction RD-side of the first chamber 510 and above the second chamber 520. The first chamber 510 is separated from the second chamber 520 and the third chamber 530 by a dashboard DB. The second chamber 520 is separated from the third chamber 530 by a floor panel FP.

The first chamber 510 is configured to place suspension members 550 and at least part of components of a fuel cell system (fuel cell system 200 described later) including a fuel cell module 100 therein. The suspension member 550 is a columnar shape member arranged to have its longitudinal direction along the vehicle longitudinal direction and is located on a vertically downward direction G-side of the fuel cell module 100. Another suspension member 550 of approximately the same shape is placed to be away from the suspension member 550 by a predetermined width in the vehicle width direction LH, although not being illustrated. Accordingly, the pair of suspension members 550 are arranged to be away from each other by the predetermined width in the vehicle width direction LH and are placed in the first chamber 510. Each of the suspension members 550 is formed in a shape bent in the middle along the vehicle longitudinal direction. More specifically, both a front portion and a rear portion of the suspension member 550 are arranged such as to be approximately parallel to the vehicle longitudinal direction. The front portion of the suspension member 550 is located above the rear portion of the suspension member 550. A middle portion of the suspension member 550 is configured to be gently inclined downward from a connection part with the front portion to a connection part with the rear portion. This configuration enables the front portion of the suspension member 550 to be moved upward in the event of a collision, i.e., in the case where a load is applied in the vehicle longitudinal direction. A rearward direction RD-side end of the suspension member 550 is fixed to a side member (not shown). The side member is a member provided as part of a vehicle body frame, i.e., a vehicle skeleton, and is a columnar shape member arranged to have its longitudinal direction along the vehicle longitudinal direction. A forward direction FD-side end of the suspension member 550 is, on the other hand, open. The suspension member 550 and the side member (not shown) are both made of a steel material. The suspension member 550 corresponds to a subordinate concept of the vehicle body frame in the claims.

The fuel cell module 100 includes a fuel cell stack 101 and a supporting frame 150. As described later, the fuel cell module 100 further includes a case (case 130 described later), which is omitted from the illustration of FIG. 1. The fuel cell stack 101 is configured as a stacked body including a plurality of unit cells (unit cells 11 described later). The supporting frame 150 is a plate-like member configured to support the fuel cell stack 101 from below. The detailed configuration of the fuel cell module 100 including the fuel cell stack 101 and the supporting frame 150 will be described in detail. As shown in FIG. 1, the fuel cell module 100 is placed to be inclined downward toward the tank 20 in the vehicle longitudinal direction. In other words, the fuel cell module 100 is arranged to be inclined to the horizontal direction such as to be located at the lower position toward the rearward direction RD. The inclined arrangement of the fuel cell module 100 causes water in the fuel cell stack 101 to be collected in the rearward direction RD by use of gravity and readily drained from the fuel cell stack 101.

A rear side of the fuel cell module 100 is mounted to the suspension members 550 by rear side mounting portions 401. The rear side mounting portion 401 includes a first mounting member 410 and a second mounting member 420.

The first mounting member 410 is connected with the suspension member 550. The first mounting member 410 is also called rear mount. According to the embodiment, the first mounting member 410 has a structure that an elastic member is placed in a metal housing. For example, the first mounting member 410 may have a structure that a cavity of an aluminum hollow housing is filled with a columnar shape rubber member. The housing may be made of another arbitrary type of metal such as titanium, in place of aluminum. Another arbitrary type of elastic member such as a resin or a spring may be placed in the housing, in place of the columnar shape rubber member.

The second mounting member 420 is connected with the first mounting member 410 and with the fuel cell module 100 (or more specifically, its supporting frame 150). The second mounting member 420 is also called rear mount bracket. The second mounting member 420 is formed from a bent metal thin plate member. According to the embodiment, the second mounting member 420 is made of aluminum. The external shape of the second mounting member 420 will be described later.

A front side of the fuel cell module 100 is mounted to the suspension members 550 by front side mounting portions 402. The front side mounting portion 402 includes a third mounting member 430 and a fourth mounting member 440. The third mounting member 430 is called front mount and has a similar structure to that of the first mounting member 410 described above. The shape of the third mounting member 430 is, however, different from the shape of the first mounting member 410. The fourth mounting member 440 is formed from a metal massive member and is called front mount bracket. According to the embodiment, the fourth mounting member 440 is made of aluminum. The external shape of the fourth mounting member 440 will be described later. The first mounting member 410 and the third mounting member 430 may have mutually different structures.

According to the embodiment, the rear side mounting portions 401 are configured to be more easily broken than the front side mounting portions 402, when a load is applied in the vehicle longitudinal direction. According to the embodiment, the rigidity of the rear side mounting portions 401 is lower than the rigidity of the front side mounting portions 402. The reason for ease of breaking and the difference in rigidity will be described later.

The second chamber 520 is configured to place a tank 20 for storing hydrogen gas therein. The second chamber 520 is formed on the rearward direction RD-side of the first chamber 510 under the floor of the fuel cell vehicle 500. The second chamber 520 is formed along the vehicle longitudinal direction on the approximate center in the vehicle width direction LH. A ceiling portion of the second chamber 520 is formed by the floor panel FP of the third chamber 530. Part of the floor of the third chamber 530 corresponding to the second chamber 520 is protruded upward in the vertical direction, compared with the remaining part of the floor. The second chamber 520 has a similar configuration to that of a center tunnel in which a driveshaft is placed in an engine-equipped vehicle. A wire harness (not shown) and the like, in addition to the tank 20, are also placed in the second chamber 520.

The third chamber 530 is a passenger compartment and is provided with a plurality of seats as shown by the broken line in FIG. 1. The third chamber 530 is substantially located in a region placed between a pair of front wheels FW and a pair of rear wheels RW. The third chamber 530 and the first chamber 510 are parted from each other by the dashboard DB.

A2. Configuration of Fuel Cell System

Figure 2:
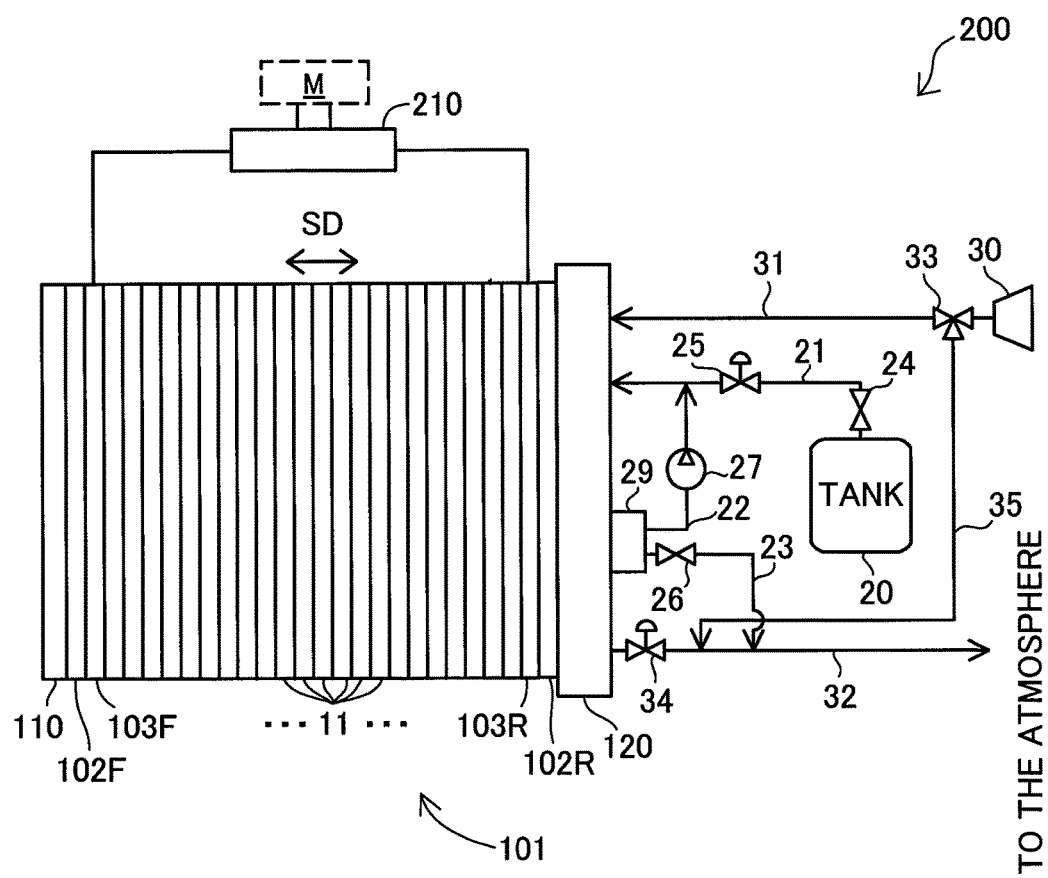
FIG. 2 is a block diagram illustrating the schematic configuration of a fuel cell system mounted on the fuel cell vehicle.

FIG. 2 is a block diagram illustrating the schematic configuration of a fuel cell system 200 mounted on the fuel cell vehicle 500. The fuel cell system 200 includes a gas-liquid separator 29, an air compressor 30, a shut-off valve 24, an injector 25, an exhaust drainage valve 26, a circulating pump 27, a three-way valve 33, a pressure regulating valve 34, a fuel gas supply path 21, a fuel gas circulation path 22, a fuel gas discharge path 23, an oxidant gas supply path 31, an oxidant gas discharge path 32, a bypass flow path 35 and a DC-DC converter 210, in addition to the fuel cell stack 101 and the tank 20 described above. The fuel cell system 200 further includes a mechanism configured to circulate a cooling medium through the fuel cell stack 101, although not being illustrated.

The fuel cell stack 101 includes a plurality of stacked unit cells 11 and a pair of end plates 110 and 120 provided at the respective ends in its stacking direction SD. Each unit cell 11 is a polymer electrolyte fuel cell configured to generate electric power by an electrochemical reaction between a fuel gas and an oxidant gas that are respectively supplied to an anode-side catalyst electrode layer and to a cathode-side catalyst electrode layer provided across a solid polymer electrolyte membrane. According to the first embodiment, the fuel gas is hydrogen gas, and the oxidant gas is the air. The fuel cell stack 101 is arranged such that the end plate 110 is located on the forward direction FD-side and the end plate 120 is located on the rearward direction RD-side. The catalyst electrode layer is configured to include carbon particles with a catalyst such as platinum (Pt) supported thereon and an electrolyte. Gas diffusion layers made of a porous material are placed outside of the catalyst electrode layers on the respective electrode sides in the unit cell 11. The porous material may be, for example, porous carbon such as carbon paper or carbon cloth or porous metal such as metal mesh or foamed metal. Manifolds (not shown) for the fuel gas, the oxidant gas and the cooling medium are formed along the stacking direction SD of the unit cells 11 inside of the fuel cell stack 101. The unit cell 11 may not be necessarily limited to the polymer electrolyte fuel cell but may be any other type of fuel cell such as solid oxide fuel cell.

The pair of end plates 110 and 120 serve to place the stacked body including the plurality of unit cells 11 therebetween. In the pair of end plates 110 and 120, the end plate 120 has a function of providing flow paths for supplying and discharging the fuel gas, the oxidant gas, and the cooling medium to and from the manifolds formed in the fuel cell stack 101. The end plate 110, on the other hand, does not have such a function. Both the end plate 110 and the end plate 120 have approximately plate-like external shapes with their thickness directions aligned with the stacking direction SD.

The tank 20 is configured to store high-pressure hydrogen and supply hydrogen gas as the fuel gas to the fuel cell stack 101 through the fuel gas supply path 21. As shown in FIG. 1, the tank 20 has an approximately cylindrical external shape and is placed in the second chamber 520 such that its longitudinal direction is aligned with the vehicle longitudinal direction. The shut-off valve 24 is placed in the vicinity of a fuel gas discharge port of the tank 20 and is configured to change over between the supply and the stop of hydrogen gas from the tank 20 in response to instructions from a controller (not shown). The injector 25 is placed in the fuel gas supply path 21 and is configured to regulate the supply amount (flow rate) and the pressure of hydrogen gas supplied to the fuel cell stack 101. The gas-liquid separator 29 is connected with the fuel gas discharge manifold in the fuel cell stack 101 and is configured to separate and discharge water included in an off-gas discharged from this manifold and to discharge a gas (fuel gas) after separation of water. The circulating pump 27 is placed in the fuel gas circulation path 22 and is configured to feed the fuel gas (fuel gas after separation of water) discharged from the gas-liquid separator 29 to the fuel gas supply path 21. The exhaust drainage valve 26 is placed in the fuel gas discharge path 23 and is configured to change over between the discharge and the stop of water and the off-gas from the gas-liquid separator 29. The air compressor 30 is configured to supply the air as the oxidant gas to the fuel cell stack 101. The three-way valve 33 is placed in the oxidant gas supply path 31 and is configured to regulate the amount of the air to be supplied to the oxidant gas supply path 31 and the amount of the air to be supplied to the bypass flow path 35 in the total amount of the air supplied from the air compressor 30. The pressure regulating valve 34 is placed at a connection part with the fuel cell stack 101 in the oxidant gas discharge path 32 and is configured to regulate the pressure on the cathode discharge side (back pressure) in the fuel cell stack 101 and thereby regulate the cathode-side pressure in the respective unit cells 11.

The following describes the flow of the fuel gas in the fuel cell system 200. The hydrogen gas fed from the tank 20 is supplied to the fuel cell stack 101 through the fuel gas supply path 21. The off-gas (anode-side off-gas) discharged from the fuel cell stack 101 is supplied to the gas-liquid separator 29, which separates at least part of water included in the off-gas. The off-gas after separation of water (i.e., fuel gas) is recirculated to the fuel gas supply path 21 through the fuel gas circulation path 22 and the circulating pump 27 and is again supplied to the fuel cell stack 101. Part of the off-gas supplied to the gas-liquid separator 29 is discharged from the gas-liquid separator 29 to the fuel gas discharge path 23 through the exhaust drainage valve 26, in addition to the water separated from the off-gas. The fuel gas discharge path 23 is connected with the oxidant gas discharge path 32, and the water and the anode-side off-gas discharged to the fuel gas discharge path 23 are discharged to the atmosphere through the oxidant gas discharge path 32, along with the water and the cathode-side off-gas discharged from the fuel cell stack 101. The fuel gas discharge path 23 communicates with the oxidant gas discharge path 32 that is open to the atmosphere, while a back pressure higher than the atmospheric pressure is applied to inside of the gas-liquid separator 29. There is accordingly a pressure difference across the exhaust drainage valve 26. When the exhaust drainage valve 26 is opened, the off-gas is discharged from the gas-liquid separator 29 to the fuel gas discharge path 23 by the above pressure difference.

The following describes the flow of the oxidant gas in the fuel cell system 200. The air (compressed air) fed from the air compressor 30 is supplied to the fuel cell stack 101 through the oxidant gas supply path 31. The amount of the air supplied to the fuel cell stack 101 is regulated by adjusting the position of the three-way valve 33. The off-gas (cathode-side off-gas) and the water discharged from the fuel cell stack 101 are discharged to the oxidant gas discharge path 32 via the pressure regulating valve 34. The oxidant gas discharge path 32 is connected with the fuel gas discharge path 23 as described above and is also connected with the bypass flow path 35. The cathode-side off-gas discharged from the fuel cell stack 101 is discharged to the atmosphere, along with the anode-side off-gas and the water discharged through the fuel gas discharge path 23 and the air discharged through the bypass flow path 35.

The fuel cell stack 101 is arranged to be inclined to the horizontal direction such as to be placed at the lower position toward the rearward direction RD as described above, so that the end plate 120 is located at the lowermost position in the vertically downward direction G in the fuel cell stack 101. This configuration causes the water in the fuel cell stack 101 to move through the respective manifolds toward the end plate 120 by the gravity and accelerates drainage of water from the fuel cell stack 101.

A pair of current collectors 103F and 103 R in the fuel cell stack 101 are electrically connected with the DC-DC converter 210. An insulating plate 102F is placed between the current collector 103F and the end plate 110. Similarly, an insulating plate 102R is placed between the current collector 103R and the end plate 120. The DC-DC converter 210 is electrically connected with the motor M and is configured to boost the output voltage of the fuel cell stack 101 and supply the boosted voltage to the motor M.

The operations of the exhaust drainage valve 26, the air compressor 30, the circulation pump 27, and the other respective valves described above are controlled by a controller (not shown). This controller may be configured to include a ROM (Read Only Memory) that stores control programs, a CPU (Central Processing Unit) that reads out the control programs from the ROM and executes the control programs, and a RAM (Random Access Memory) that is used as a work area of the CPU.

A3. Configuration of Fuel Cell Module

Figure 3:
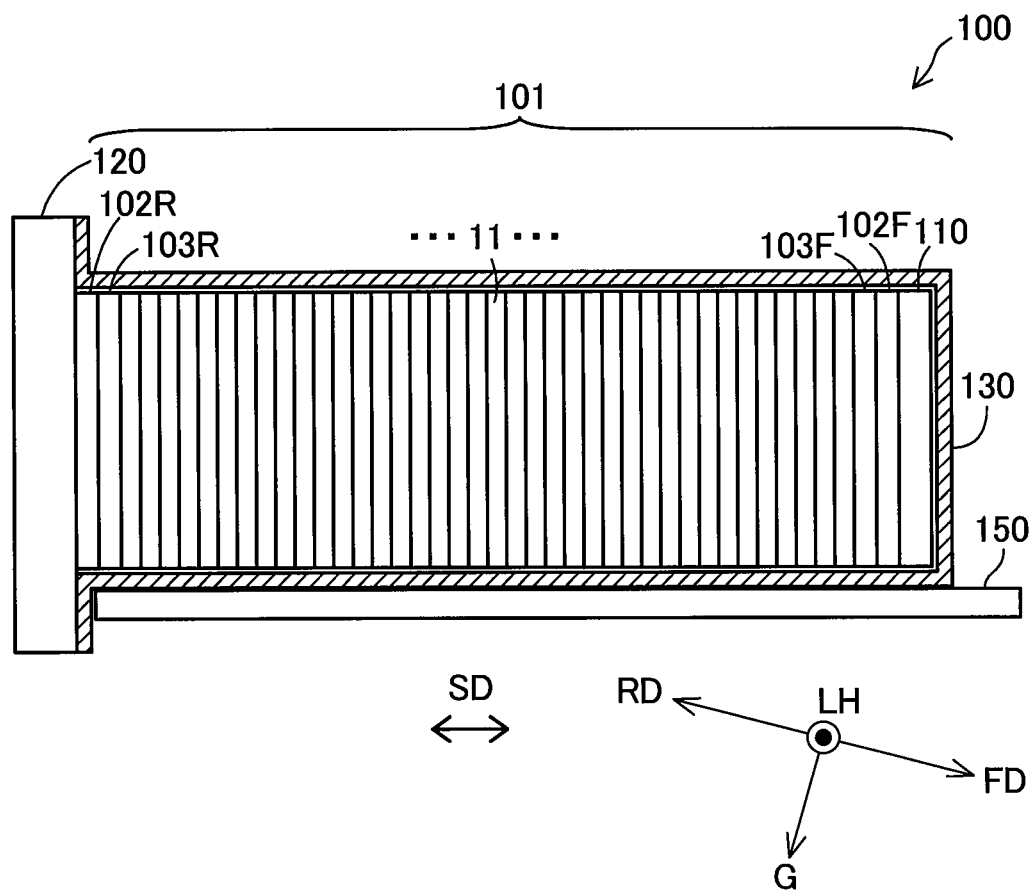
FIG. 3 is a sectional view illustrating the schematic configuration of a fuel cell module.

FIG. 3 is a sectional view illustrating the schematic configuration of the fuel cell module 100. FIG. 3 illustrates a section of the fuel cell module 100 at a position similar to that of FIG. 1. The fuel cell module 100 includes a case 130, in addition to the fuel cell stack 101 and the supporting frame 150 described above.

The fuel cell stack 101 is configured to include the pair of insulating plates 102F and 102R, in addition to the plurality of stacked unit cells 11, the pair of end plates 110 and 120 and the pair of current collectors 103F and 103R described above. The pair of current collectors 103F and 103R serve as the overall electrodes. The current collector 103F is placed on the forward direction FD-side of the forward-most unit cell 11 among the plurality of unit cells 11 to adjoin to this forward-most unit cell 11. The current collector 103R is placed on the rearward direction RD-side of the rearward-most unit cell 11 among the plurality of unit cells 11 to adjoin to this rearward-most unit cell 11. The pair of insulating plates 102F and 102F are plate-like members made of an insulating material. The insulating plate 102F is placed between the end plate 110 and the current collector 103F to electrically insulate the current collector 103F from the end plate 110. Similarly, the insulating plate 102R is placed between the end plate 120 and the current collector 103R to electrically insulate the current collector 103R from the end plate 120.

The case 130 is configured to place the remaining part of the fuel cell stack 101 other than the end plate 120 therein. In other words, the fuel cell stack 101 with the end plate 120 exposed is placed in the case 130. According to the first embodiment, the case 130 is made of aluminum (Al). The material of the case 130 is, however, not limited to aluminum but may be carbon steel, titanium (Ti) or any of metal alloys thereof or may be stainless steel (SUS). The material of the case 130 is not limited to the metal but may be a resin or the like.

Figure 4:
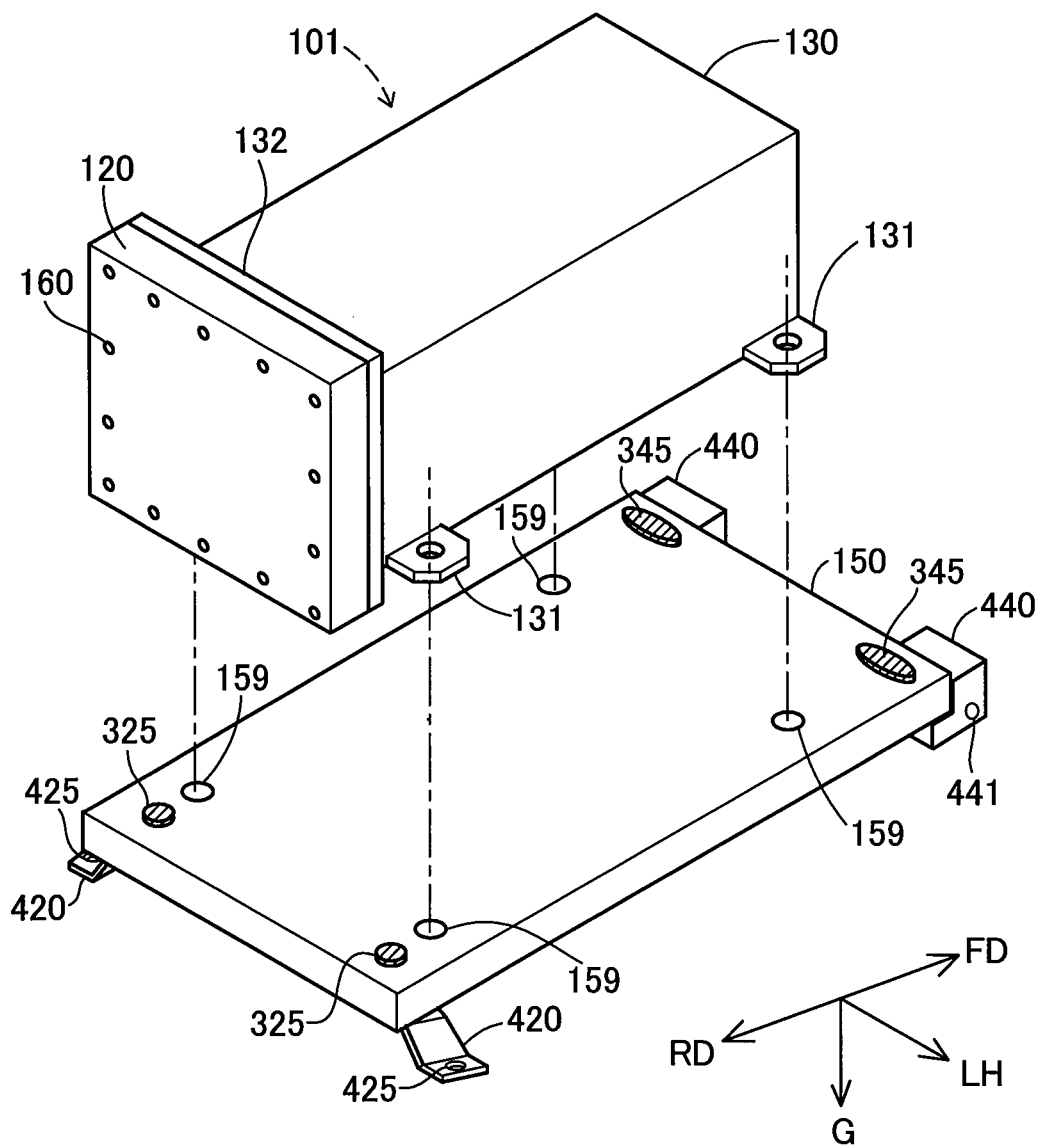
FIG. 4 is a perspective view illustrating the configuration of a case and a supporting frame.

FIG. 4 is a perspective view illustrating the configuration of the case 130 and the supporting frame 150. In FIG. 4, the upper side shows an external perspective view of the case 130 with the fuel cell stack 101 placed therein, and the lower side shows an external perspective view of the supporting frame 150. The second mounting members 420 and the fourth mounting member 440 connected with the supporting frame 150 are also shown in FIG. 4.

The case 130 has a tubular external shape that is open at an end on the rearward direction RD-side and is hollow inside. The remaining part of the fuel cell stack 101 other than the end plate 120 is placed in an inner space of the case 130. A flange portion 132 is formed at the end on the rearward direction RD-side of the case 130 to be protruded outward. A plurality of threaded holes (not shown) are formed in this flange portion 132. In the state that the end plate 120 and the case 130 are in contact with each other, threaded holes of the end plate 120 described above are aligned with the threaded holes of the case 130 to be connected with each other. Screws 160 are inserted in these connected threaded holes and are screwed, so that the end plate 120 and the case 130 are fastened to each other.

Fixing elements 131 are formed at four corners on the bottom of the case 130. The fixing element 131 is protruded in the approximately horizontal direction and has a through hole that is formed at the center portion to pass through in the thickness direction.

The supporting frame 150 has a plate-like external shape. The supporting frame 150 also has a hollow structure. Four through holes 159 are formed in the supporting frame 150 (or more specifically in a wall portion forming the supporting frame 150) to pass through in the thickness direction. These through holes 159 are formed at positions corresponding to the through holes of the fixing elements 131 of the case 130 described above to be located on the vertically downward direction G-side of these through holes. The case 130 is mounted on an upper surface of the supporting frame 150, and bolts (not shown) are inserted into the through holes of the fixing element 131 and into the through holes 159 of the supporting frame 150 to be screwed into nuts (not shown) placed on a bottom surface of the supporting frame 150, so that the case 130 is fastened to the supporting frame 150. In addition to the above four through holes 159, four other through holes (not shown) are formed in the supporting frame 150. FIG. 4 shows caps 325 and 345 mounted to the four other through holes.

The fourth mounting members 440 have an L-shaped external shape in a section parallel to the vehicle longitudinal direction and are arranged at two corners on the forward direction FD-side of the supporting frame 150. The fourth mounting members 440 are connected with the supporting frame 150 by means of front side connecting members (front side connecting members 340 described later). A threaded hole 441 is formed on an outer end face of the fourth mounting member 440 in the vehicle width direction LH.

The second mounting members 420 are arranged in the vicinities of the two corners on the rearward direction RD-side of a lower surface wall portion (lower surface wall portion 152 described later) of the supporting frame 150. A through hole 425 is formed in the second mounting member 420 such as to pass through in the thickness direction.

The following describes the detailed configuration of the front side mounting portions 402 including the fourth mounting members 440 described above and the rear side mounting portions 401 including the second mounting members 420.

A4. Detailed Configuration of Mounting Portions

Figure 5:
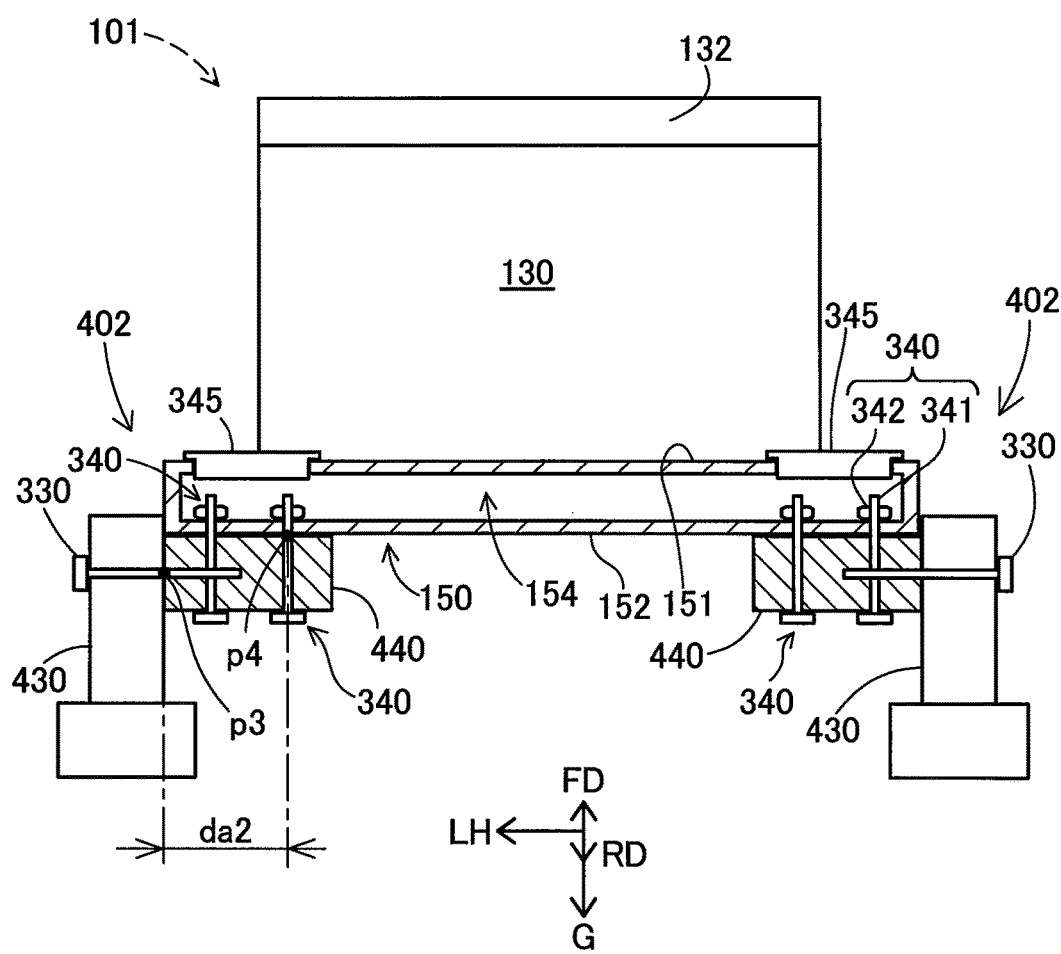
FIG. 5 is a diagram schematically illustrating the detailed configuration of front side mounting portions.

FIG. 5 is a diagram schematically illustrating the detailed configuration of the front side mounting portions 402. FIG. 5 illustrates the case 130, the supporting frame 150 and the front side mounting portions 402 viewed in the rearward direction RD. The case 130 is shown in the external shape viewed in the rearward direction RD in FIG. 5. The supporting frame 150 is shown with omission of a wall portion on the forward direction FD-side end. The front side mounting portions 402 are shown as sections parallel to the vehicle width direction LH that pass through the joints between the third mounting members 430 and the fourth mounting members 440.

The supporting frame 150 includes an upper surface wall portion 151 and a lower surface wall portion 152, and the fuel cell stack 101 is placed on an upper surface of the upper surface wall portion 151. An inner space 154 is formed between the upper surface wall portion 151 and the lower surface wall portion 152. A through hole is formed in an upper portion of the third mounting member 430 such as to pass through in the thickness direction (direction parallel to the vehicle width direction LH). The third mounting member 430 is arranged such that this through hole and the threaded hole 441 of the fourth mounting member 440 described above are aligned and connected with each other. A bolt 330 is inserted into the through hole of the third mounting member 430 and into the threaded hole 441 that are aligned and connected with each other, and a leading end of the bolt 330 is screwed into the threaded hole 441, so that the third mounting member 430 and the fourth mounting member 440 are connected with each other.

The fourth mounting member 440 is connected with the lower surface wall portion 152 of the supporting frame 150 by front side connecting members 340. The front side connecting members 340 and the bolt 330 are actually not located on a single plane parallel to the vehicle width direction LH, but are shown on an identical section for the convenience of illustration. A through hole is formed in the upper surface wall portion 151 vertically above the front side connecting members 340, and the cap 345 mentioned above is fit in this through hole. The front side connecting member 340 includes a bolt 341 and a nut 342. Two through holes are formed in the fourth mounting member 440 to be extended in a direction parallel to the vertically downward direction G and to be arrayed in the vehicle width direction LH. Two through holes are also formed in the lower surface wall portion 152 in a location connected with the fourth mounting member 440 to pass through the lower surface wall portion 152 in the thickness direction (direction parallel to the vertically downward direction G) and to be arrayed in the vehicle width direction LH. The fourth mounting member 440 is arranged such that the two through holes of the fourth mounting member 440 described above are aligned and connected with the two through holes of the lower surface wall portion 152. The two bolts 341 are inserted into the two through holes of the fourth mounting member 440 and into the two through holes of the lower surface wall portion 152. Leading ends of the bolts 341 are placed in the inner space 154 and are screwed into the nuts 342 that are also placed in the inner space 154. This connects the fourth mounting member 440 with the supporting frame 150. As shown in FIG. 5, when being viewed in the vehicle longitudinal direction, the shafts of the bolts 341 of the front side connecting members 340 intersect with the shaft of the bolt 330.

Figure 6:
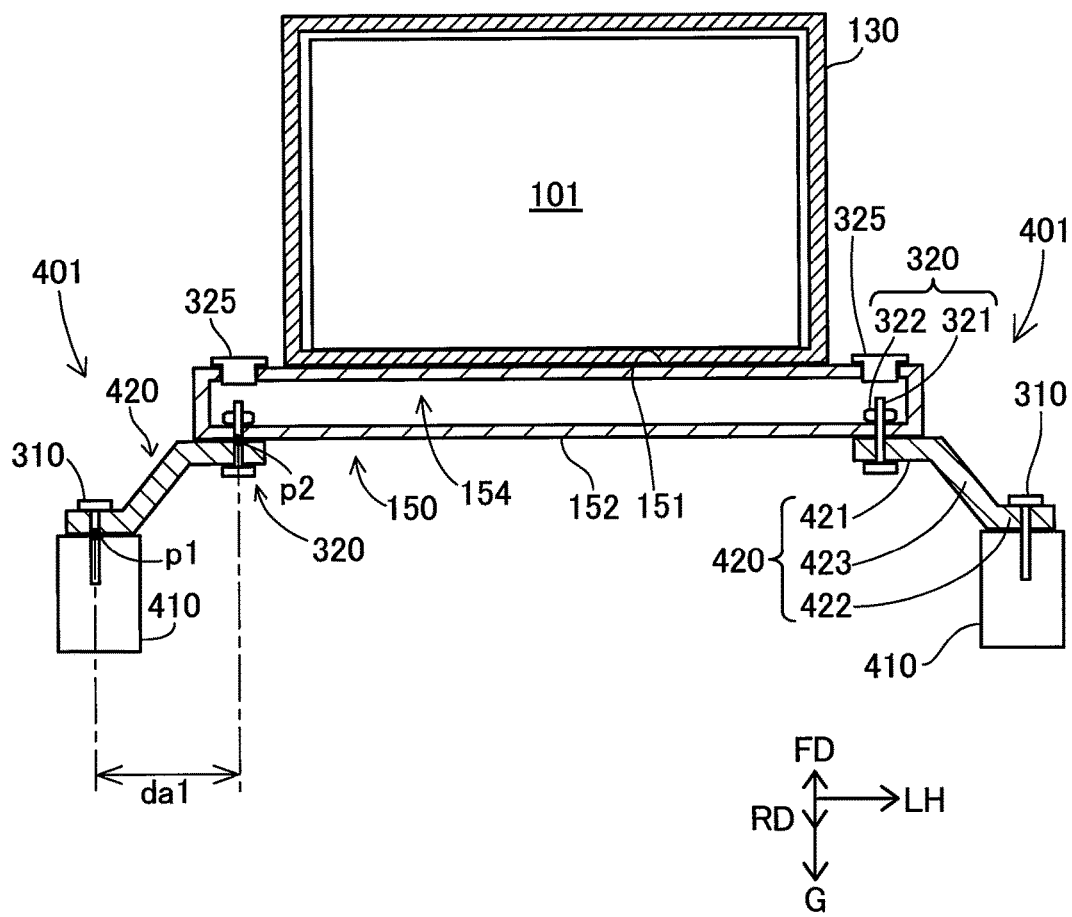
FIG. 6 is a diagram schematically illustrating the detailed configuration of rear side mounting portions.

FIG. 6 is a diagram schematically illustrating the detailed configuration of the rear side mounting portions 401. FIG. 6 illustrates the fuel cell stack 101, the case 130, the supporting frame 150 and the rear side mounting portions 401 viewed in the forward direction FD. The fuel cell stack 101 is shows in the schematic external shape viewed in the forward direction FD in FIG. 6. The supporting frame 150 is shown with omission of a wall portion on the rearward direction RD-side end. The rear side mounting portions 401 are shown as sections parallel to the vehicle width direction LH that pass through the joints between the first mounting members 410 and the second mounting members 420.

A threaded hole is formed in an upper surface of the first mounting member 410 to be extended in the vertically downward direction G. The first mounting member 410 is arranged such that this threaded hole and the through hole 425 of the second mounting member 420 described above are aligned and connected with each other. A bolt 310 is inserted into the threaded hole of the first mounting member 410 and into the through hole 425 of the second mounting member 420 that are aligned and connected with each other, and a leading end of the bolt 310 is screwed into the threaded hole of the first mounting member 410, so that the first mounting member 410 and the second mounting member 420 are connected with each other.

The second mounting member 420 is connected with the lower surface wall portion 152 of the supporting frame 150 by a rear side connecting member 320. A through hole is formed in the upper surface wall portion 151 vertically above the rear side connecting member 320, and the cap 325 mentioned above is fit in this through hole. The rear side connecting member 320 includes a bolt 321 and a nut 322. The second mounting member 420 includes a first base portion 421, a second base portion 422 and an inclined portion 423. The first base portion 421 is arranged to be parallel to the lower surface wall portion 152 of the supporting frame 150 and is connected with the supporting frame 150 by the rear side connecting member 320. A through hole is formed in the first base portion 421. A through hole is formed in the lower surface wall portion 152 in a location connected with the second mounting member 420 to pass through the lower surface wall portion 152 in the thickness direction (direction parallel to the vertically downward direction G). The bolt 321 is inserted into the through hole of the first base portion 421 described above and into the through hole of the lower surface wall portion 152. A leading end of the bolt 321 is placed in the inner space 154 and is screwed into the nut 322 that is also placed in the inner space 154. This connects the second mounting member 420 with the supporting frame 150. As shown in FIG. 6, when being viewed in the vehicle longitudinal direction, the shaft of the bolt 321 of the rear side connecting member 320 is parallel to the shaft of the bolt 310.

As shown in FIG. 6, a distance da1 between a connection p1 of the first mounting member 410 with the second mounting member 420 and a connection p2 of the second mounting member 420 with the supporting frame 150 is larger than a distance da1 shown in FIG. 5. According to the embodiment, the connection p1 is a point on the bolt 310 and is a point corresponding to the boundary between the first mounting member 410 and the second mounting member 420. According to the embodiment, the connection p2 is a point on the bolt 321 and is a point corresponding to the boundary between the second mounting member 420 and the supporting frame 150. The distance da2 shown in FIG. 5 is a distance between a connection p3 of the third mounting member 430 with the fourth mounting member 440 and a connection p4 of the fourth mounting member 440 with the supporting frame 150. According to the embodiment, the connection p3 is a point on the bolt 330 and is a point corresponding to the boundary between the third mounting member 430 and the fourth mounting member 440. According to the embodiment, the connection p4 is a point on the bolt 341 farther from the third mounting member 430, out of the two bolts 341 attached to the fourth mounting member 440 and is a point corresponding to the boundary between the fourth mounting member 440 and the supporting frame 150. The point p4 may alternatively be a point on the bolt 341 nearer to the third mounting member 430, out of the two bolts 341 attached to the fourth mounting member 440. The latter configuration provides a larger difference between the distance da1 and the distance da2. In FIGS. 5 and 6, the distances da1 and da2 are shown as distances along the vehicle width direction LH. These distances da1 and da2, however, include distance components in the vehicle longitudinal direction.

As described above, in the front side mounting portion 402, the distance da2 between the connection (connection p3) of the third mounting member 430 with the fourth mounting member 440 and the connection (connection p4) of the fourth mounting member 440 with the supporting frame 150 is smaller than the distance da1. Additionally, the shafts of the bolts 341 of the front side connecting members 340 intersect with the shaft of the bolt 330, when being viewed in the vehicle longitudinal direction. In the rear side mounting portion 401, on the other hand, the distance da1 between the connection (connection p1) of the first mounting member 410 with the second mounting member 420 and the connection (connection p2) of the second mounting member 420 with the supporting frame 150 is larger than the distance da2. Additionally, the shaft of the bolt 321 of the rear side connecting member 320 is parallel to the shaft of the bolt 310, when being viewed in the vehicle longitudinal direction. According to the embodiment, the rear side mounting portion 401 is configured to be more easily breakable than the front side mounting portion 402, when a load is applied in the vehicle longitudinal direction. According to the embodiment, the rigidity of the rear side mounting portion 401 is set to be lower than the rigidity of the front side mounting portion 402.

A5. Operations in the Event of Collision

Figure 7:
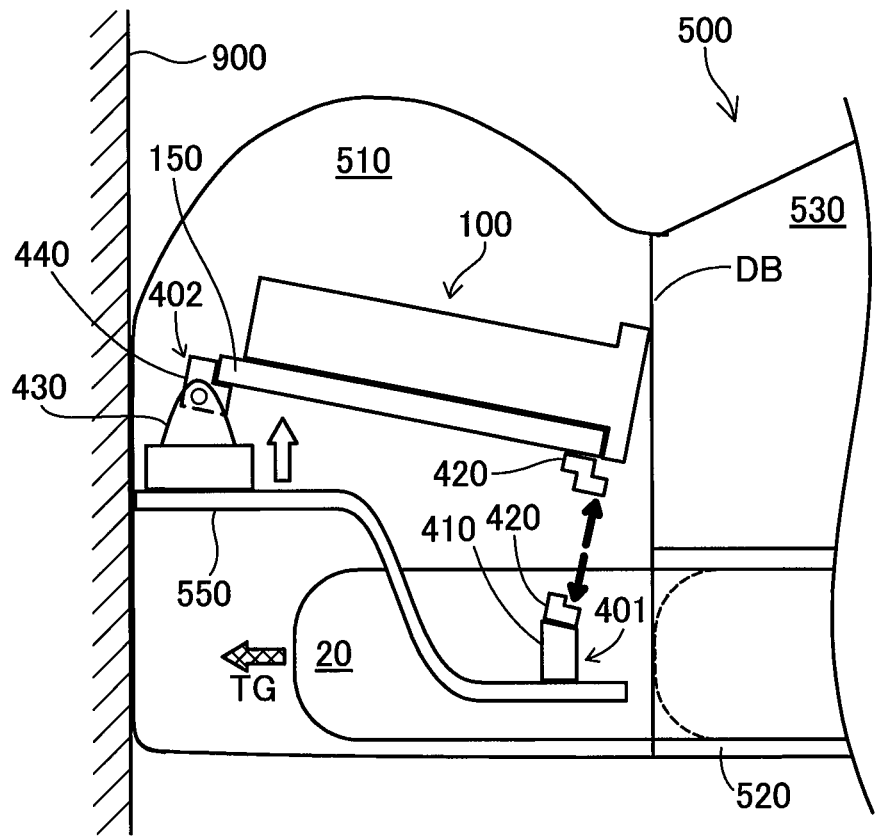
FIG. 7 is a sectional view schematically illustrating the state in a first chamber in the event of a collision.

FIG. 7 is a sectional view schematically illustrating the state in the first chamber 510 in the event of a collision. FIG. 7 shows the forward direction FD-side of the fuel cell vehicle 500 in the event of a front collision, with omission of the rearward direction RD-side of the fuel cell vehicle 500. FIG. 7 shows a sectional view of the schematic configuration of the fuel cell vehicle 500 at a position similar to that of FIG. 1. For convenience of illustration, the front wheels FW are omitted from the illustration of FIG. 7.

When the fuel cell vehicle 500 comes into collision with a collision object 900 ahead of the vehicle, a load in the rearward direction RD is applied from the collision object 900 to the suspension members 550. The rearward direction RD-side end of the suspension member 550 is fixed to the side member (not shown), so that an inertial force in the forward direction FD is applied from the side member to the suspension member 550. Applying the loads in the forward direction FD and the rearward direction RD in this manner compresses and deforms the suspension member 550 in the vehicle longitudinal direction. In this state, the front portion of the suspension member 550 is moved upward, due to the configuration of the suspension member 550 or more specifically the configuration that the front portion is located above the rear portion and that the middle portion is inclined in the vertically downward direction G toward the rearward direction RD. According to the embodiment, the rear side mounting portion 401 (second mounting member 420) is broken, while the front side mounting portion 402 is not broken. The fuel cell module 100 connected with the suspension members 550 via the front side mounting portions 402 accordingly moves upward along with the front portions of the suspension members 550. The entire first chamber 510 is also compressed in the vehicle longitudinal direction by the impact of the collision. A rearward direction RD-side end of the fuel cell module 100 moving upward accordingly comes into contact with the dashboard DB. According to the embodiment, the fuel cell module 100 thus move upward while keeping substantially the same attitude. The breakage of the second mounting member 420 will be described later more in detail.

When the fuel cell system 200 is unfixed from the vehicle body frame by the collision, the tank 20 is moved forward by the inertial force as shown by a hatched arrow TG in FIG. 7. In this state, the tank 20 moves to enter between the pair of suspension members 550 that are arranged to be away from each other in the vehicle width direction LH. The fuel cell module 100, however, moves upward as described above, so that the tank 20 does not collide with the fuel cell module 100.

Figure 8:
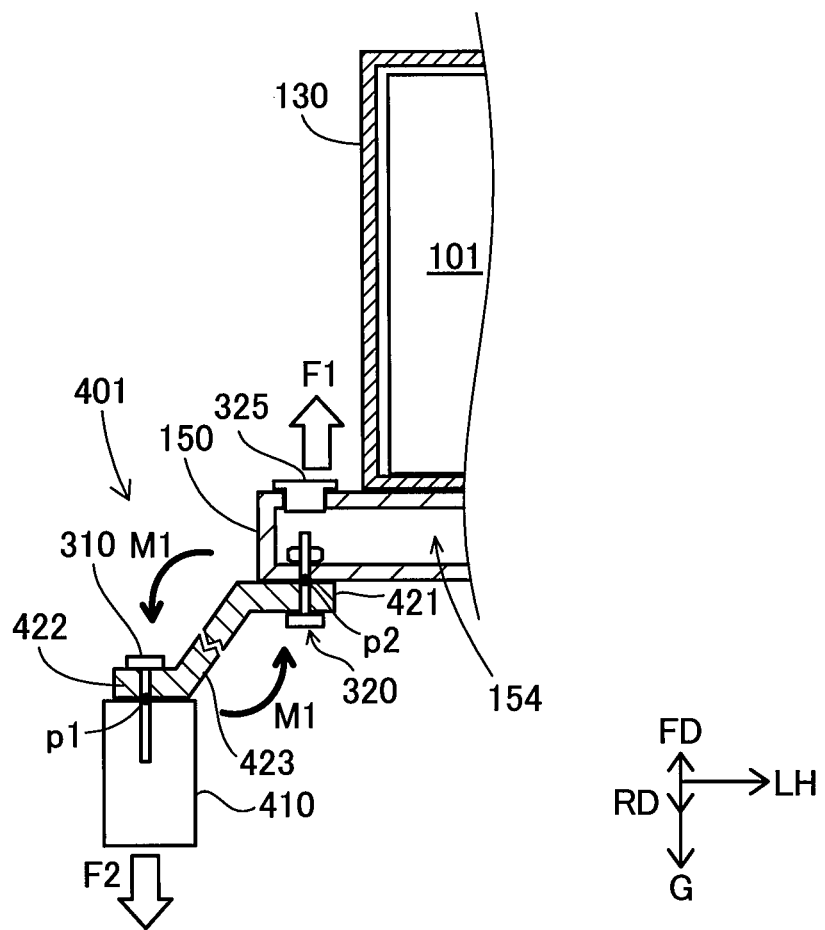
FIG. 8 is a diagram schematically illustrating the state of the rear side mounting portion in the event of a collision.

FIG. 8 is a diagram schematically illustrating the state of the rear side mounting portion 401 in the event of a collision. FIG. 8 illustrates the fuel cell stack 101, the case 130, the supporting frame 150 and the rear side mounting portion 401, when being viewed in the forward direction FD, like FIG. 6. For convenience of illustration, FIG. 8 shows an enlarged view of only part of the left side when being viewed in the forward direction FD.

In the event of a collision, as described above, the fuel cell module 100 is going to move upward, along with the upward motion of the forward direction FD-side of the suspension member 550. A load F1 in the vertically upward direction is accordingly applied to a connected portion of the second mounting member 420 that is connected with the fuel cell module 100 (the supporting frame 150) or more specifically to a portion of the second mounting member 420 which the rear side connecting member 320 including the above connection p2 is attached to. The first mounting member 410 that is connected with the rearward direction RD-side of the suspension member 550 is, on the other hand, going to stay at the position along with the side member and the rearward direction RD-side end of the suspension member 550, since the rearward direction RD-side end of the suspension member 550 is fixed to the side member. A load F2 in the vertically downward direction G is accordingly applied from the first mounting member 410 via the bolt 310 to a connected portion of the second mounting member 420 that is connected with the first mounting member 410 or more specifically to a portion of the second mounting member 420 which the bolt 310 including the above connection p1 is attached to. Because of the relatively large distance da1 between the connection p1 and the connection p2 as described above, applying the loads F1 and F2 in the opposite directions to the respective ends of the second mounting member 420 causes a large moment (bending moment) M1 to be applied to the second mounting member 420. The second mounting member 420 is formed from a thin plate member and has a relatively low rigidity. Applying the moment causes, for example, the inclined portion 423 of the second mounting member 420 to be broken as shown in FIG. 8.

In the front side mounting portion 402, on the other hand, because of the relatively small distance da2 between the connection p1 and the connection p2, even when an upward load and a downward load are applied to the fourth mounting member 440 before breakage of the second mounting member 420, only a relatively small moment is applied to the fourth mounting member 440. Additionally, the fourth mounting member 440 is in a massive shape and has a relatively high rigidity. This suppresses the fourth mounting member 440 from being broken even when a small moment is applied to the fourth mounting member 440. This accordingly does not unfix the forward direction FD-side of the fuel cell module 100 from the suspension member 550. The fuel cell module 100 thus moves upward along with the front portion of the suspension member 550 as described above.

In the fuel cell vehicle 500 of the first embodiment described above, when a load is applied in the vehicle longitudinal direction in the event of a collision, the front portion of the suspension member 550 is moved upward. The rear side mounting portion 401 is configured to be more easily breakable than the front side mounting portion 402. The rear side mounting portion 401 or more specifically its second mounting member 420 is broken, so as to move the fuel cell module 100 upward along with the front portion of the suspension member 550. Even when the tank 20 placed on the rearward direction RD-side of the fuel cell module 100 is moved in the forward direction FD by the inertial force, this configuration suppresses a collision of the tank 20 with the fuel cell module 100. Additionally, breakage of the second mounting member 420 suppresses the rear side mounting portion 401 and the front side mounting portion 402 from interfering with deformation (compression) of the suspension member 550 and enables the impact of the collision to be absorbed by deformation of the suspension member 550.

The connection (connection p1) of the first mounting member 410 with the second mounting member 420 and the connection (connection p2) of the second mounting member 420 with the fuel cell module 100 are arranged to be away from each other in the vertical direction. When the second mounting member 420 connected with the fuel cell module 100 is going to move upward along with the upward motion of the front portion of the suspension member 550 in the event of a collision, this configuration generates a large moment between the connection (connection p1) of the first mounting member 410 with the second mounting member 420 and the connection (connection p2) of the second mounting member 420 with the fuel cell module 100, i.e., in the second mounting member 420 and thereby makes it easier to break the second mounting member 420.

The distance da1 between the connection (connection p1) of the first mounting member 410 with the second mounting member 420 and the connection (connection p2) of the second mounting member 420 with the fuel cell module 100 is larger than the distance da1 between the connection (connection p3) of the third mounting member 430 with the fourth mounting member 440 and the connection (connection p4) of the fourth mounting member 440 with the fuel cell module 100. In the event of a collision, this configuration generates a larger moment in the second mounting member 420 compared with a moment generated in the fourth mounting member 440 and further makes it easier to break the second mounting member 420.

B. Second Embodiment

Figure 9:
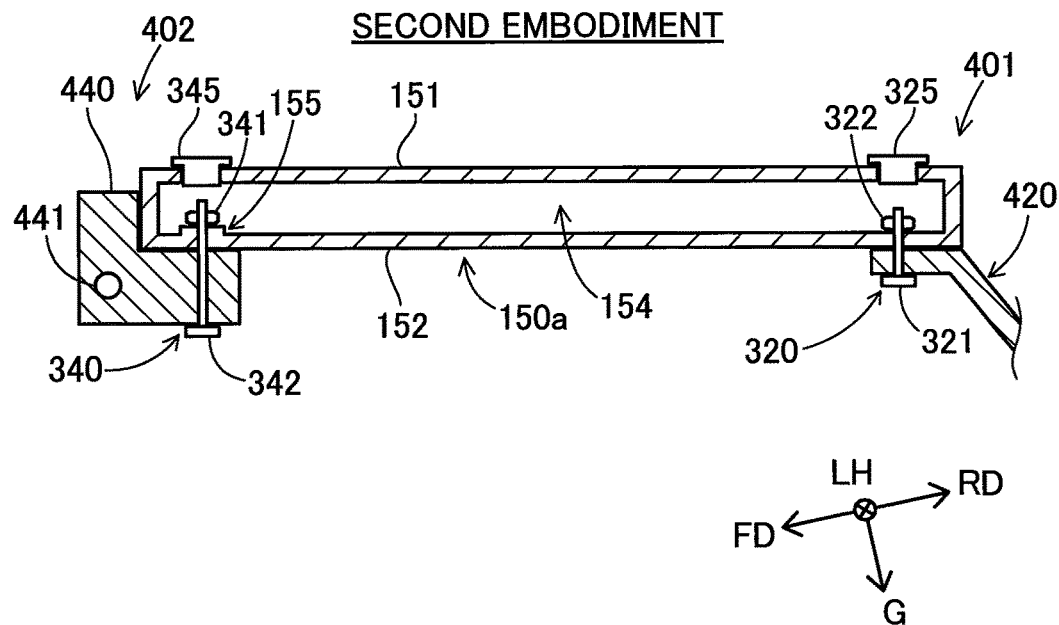
FIG. 9 is a sectional view illustrating the detailed configuration of a supporting frame in a fuel cell module according to a second embodiment.

FIG. 9 is a sectional view illustrating the detailed configuration of a supporting frame 150a in a fuel cell module according to a second embodiment. FIG. 9 illustrates a section parallel to the vehicle longitudinal direction at a position passing through the rear side mounting portion 401 and the front side mounting portion 402. The fuel cell stack 101 and the case 130 are omitted from the illustration of FIG. 9. A fuel cell vehicle of the second embodiment differs from the fuel cell vehicle 500 of the first embodiment by the supporting frame 150a provided in place of the supporting frame 150. The other configuration of the fuel cell vehicle of the second embodiment is similar to that of the fuel cell vehicle 500 of the first embodiment. Like components are expressed by like reference signs, and their detailed description is omitted.

As shown in FIG. 9, in the supporting frame 150a of the second embodiment, a rib 155 is formed in a region of a lower surface wall portion 152 which the bolt 341 of the front side mounting portion 402 passes through. No rib is, on the other hand, formed in a region of the lower surface wall portion 152 which the bolt 321 of the rear side mounting portion 401 passes through. Accordingly, a portion of the supporting frame 150a connected with the second mounting member 420 has a lower rigidity than the rigidity of a portion of the supporting frame 150a connected with the fourth mounting member 440.

The fuel cell vehicle of the second embodiment having this configuration has similar advantageous effects to those of the fuel cell vehicle 500 of the first embodiment. The portion of the supporting frame 150a connected with the second mounting member 420 has the lower rigidity than the rigidity of the portion of the supporting frame 150a connected with the fourth mounting member 440. In the event of a collision, this configuration causes the portion of the supporting frame 150a connected with the second mounting member 420 to be more easily breakable, compared with the portion of the supporting frame 150a connected with the fourth mounting member 440. In the event of a collision, this configuration accordingly releases the indirect connection of the rearward direction RD-side of the fuel cell module 100 with the suspension member 550 and enables the fuel cell module 100 to move upward along with the front portion of the suspension member 550. According to the second embodiment, the rear side mounting portion 401 and the portion of the supporting frame 150a connected with the rear side connecting member 320 correspond to the subordinate concept of the rear side mounting portion in the claims. According to the second embodiment, the front side mounting portion 402 and the portion of the supporting frame 150a provided with the rib 155 and connected with the front side connecting member 340 correspond to the subordinate concept of the front side mounting portion in the claims.

C. Third Embodiment

Figure 10:
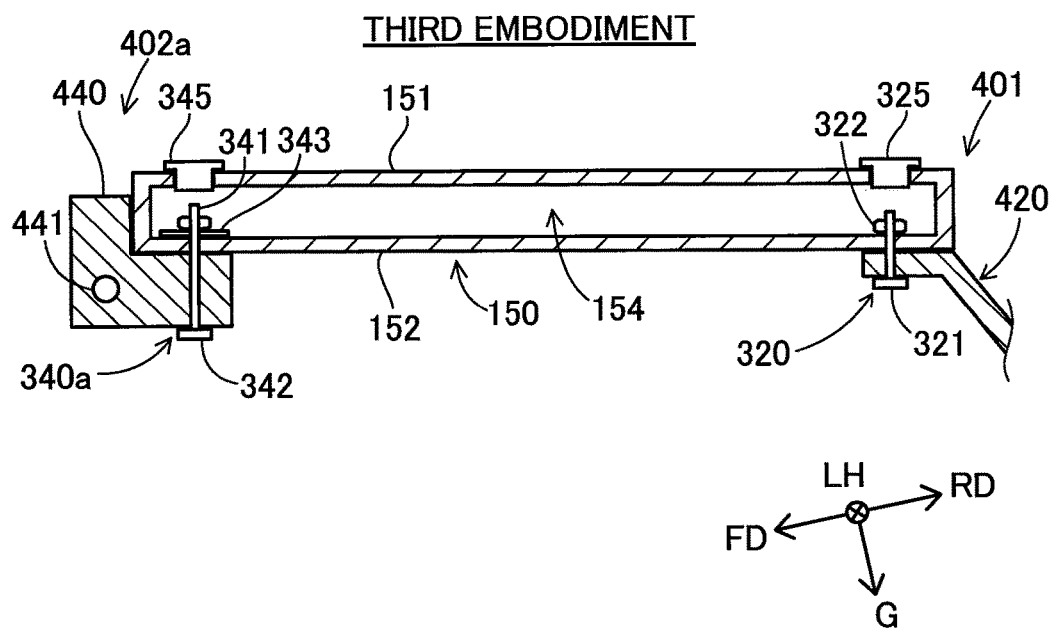
FIG. 10 is a sectional view illustrating a front side mounting portion according to a third embodiment.

FIG. 10 is a sectional view illustrating a front side mounting portion 402a according to a third embodiment. FIG. 10 illustrates the supporting frame 150 and the rear side mounting portion 401, in addition to the front side mounting portion 402a. The fuel cell stack 101 and the case 130 are omitted from the illustration of FIG. 10. Like FIG. 9, FIG. 10 illustrates a section parallel to the vehicle longitudinal direction at a position passing through the rear side mounting portion 401 and the front side mounting portion 402a.

A fuel cell vehicle of the third embodiment differs from the fuel cell vehicle 500 of the first embodiment by the front side mounting portion 402a provided in place of the front side mounting portion 402. The front side mounting portion 402a of the third embodiment differs from the front side mounting portion 402 of the first embodiment by a front side connecting member 340a provided in place of the front side connecting member 340. The other components of the front side mounting portion 402a of the third embodiment are similar to those of the front side mounting portion 402 of the first embodiment. Like components are expressed by like reference signs, and their detailed description is omitted.

The front side connecting member 340*a* of the third embodiment differs from the front side connecting member 340 of the first embodiment by only that a washer 343 is provided in addition to the bolt 341 and the nut 342. The washer 343 is placed between the lower surface wall portion 152 of the supporting frame 150 and the bolt 341. This configuration provides a relatively large contact area between the front side connecting member 340*a* and the supporting frame 150 (the lower surface wall portion 152). The rear side connecting member 320 is, on the other hand, not provided with a washer. This provides a relatively small contact area between the rear side connecting member 320 and the supporting frame 150 (the lower surface wall portion 152). According to this embodiment, the contact area between the rear side connecting member 320 and the supporting frame 150 is smaller than the contact area between the front side connecting member 340*a* and the supporting frame 150.

When loads in the upward direction and in the downward direction such as the loads F1 and F2 shown in FIG. 8 are applied to the rear side mounting portion 401 and the front side mounting portion 402*a* in the event of a collision, such a different in contact area causes a larger pressure to be applied to a portion of the supporting frame 150 which the rear side connecting member 320 is attached to, compared with a portion of the supporting frame 150 which the front side connecting member 340*a* is applied to. This makes it easier to break the portion of the supporting frame 150 which the rear side connecting member 320 is attached to. In the event of a collision, this configuration accordingly releases the indirect connection of the rearward direction RD-side of the fuel cell module 100 with the suspension member 550 and enables the fuel cell module 100 to move upward along with the front portion of the suspension member 550.

The fuel cell vehicle of the third embodiment having this configuration has similar advantageous effects to those of the fuel cell vehicle 500 of the first embodiment. Additionally, the contact area between the rear side connecting member 320 and the supporting frame 150 is smaller than the contact area between the front side connecting member 340*a* and the supporting frame 150. When a load is applied to the connected portion of the supporting frame 150 with the rear side connecting member 320 in the event of a collision, this configuration makes it easier to break the connected portion. According to the third embodiment, the rear side mounting portion 401 and the portion of the supporting frame 150 connected with the rear side connecting member 320 correspond to the subordinate concept of the rear side mounting portion in the claims. According to the third embodiment, the front side mounting portion 402*a* and the portion of the supporting frame 150 connected with the front side connecting member 340*a* correspond to the subordinate concept of the front side mounting portion in the claims.

As clearly understood from the third embodiment described above, as well as the first and the second embodiments, the configuration of the fuel cell vehicle that the rear side mounting portion is more easily breakable than the front side mounting portion under application of a load in the vehicle longitudinal direction may be applied to the fuel cell vehicle of the present disclosure.

D. Fourth Embodiment

FIG. 11 is a sectional view illustrating a suspension member 550*a* according to a fourth embodiment. FIG. 11 illustrates only part of the forward direction FD-side of the suspension member 550*a*, with omission of part of the rearward direction RD-side. FIG. 11 illustrates the fuel cell module 100, the rear side mounting portion 401 and the front side mounting portion 402, in addition to the suspension member 550*a*. Like FIG. 10, FIG. 11 illustrates a section parallel to the vehicle longitudinal direction at a position passing through the rear side mounting portion 401 and the front side mounting portion 402.

Whereas the suspension member 550 of the first embodiment has the bent sectional shape as shown in FIG. 1, the suspension member 550*a* of the fourth embodiment has a linear sectional shape.

The suspension member 550*a* includes a main part 556, a rotating part 558 and a shaft portion 559. The main part 556 has a plate-like external shape. The rear side mounting portion 401 is attached to the main part 556. A supporting portion 557 is formed on a forward direction FD-side end of the main part 556. The supporting portion 557 is formed to have a smaller thickness (i.e., smaller length parallel to the vertically downward direction G) than the thickness of the remaining portion of the main part 556. The supporting portion 557 is configured to support a rearward direction RD-side end of the rotating part 558 from below. An upper surface of the supporting portion 557 is arranged to be parallel to the vehicle longitudinal direction.

The rotating part 558 has a plate-like external shape. The rearward direction RD-side end of the rotating part 558 has a semicircular sectional shape. In the normal state, the rearward direction RD-side of the rotating part 558 is arranged to be in contact with the upper surface of the supporting portion 557. As shown in FIG. 11, a section of the rotating part 558 and a section of the main part 556 are arranged to have their longitudinal directions along the vehicle longitudinal direction and to be continuous with each other in the vehicle longitudinal direction. The front side mounting portion 402 is attached to the upper surface of the forward direction FD-side of the rotating part 558.

A through hole is formed in the rearward direction RD-side end of the rotating part 558 to be extended in the vehicle width direction LH, and the shaft portion 559 is inserted in this through hole. Respective ends in the vehicle width direction LH of the shaft portion 559 are fixed to wall portions (not shown) of the main part 556. The wall portions are arranged to be continuous with respective ends in the vehicle width direction LH of the supporting portion 557 and have planes that are respectively parallel to the vehicle width direction and the vertically downward direction G. The rotating part 558 is rotatable about this shaft portion 559 as the axis. The supporting portion 557 is located below the rearward direction RD-side end of the rotating part 558, so that the rotating part 558 is rotatable upward but is not rotatable downward. This configuration causes the front portion of the suspension member 550*a* to be movable upward when a load is applied in the vehicle longitudinal direction.

In the vehicle equipped with the suspension members 550*a* of this configuration, in the event of a front collision, the rotating part 558 rotates upward about the shaft portion 559 and the front side mounting portion 402 is going to move upward. Like the first embodiment, a load in the vertically upward direction is applied to the portion of the second mounting member 420 of the rear side mounting portion 401 which the bolt 321 of the rear side connecting member 320 is attached to, whereas a load in the vertically downward direction is applied to the portion of the second mounting member 420 which the bolt 310 is attached to. A fuel cell vehicle of the fourth embodiment accordingly has similar advantageous effects to those of the fuel cell vehicle 500 of the first embodiment.

E. Modifications

E1. Modification 1

In the respective embodiments described above, in order to make the rigidity of the rear side mounting portion 401 lower than the rigidity of the front side mounting portion 402, the distance da1 between the connection (connection p1) of the first mounting member 410 with the second mounting member 420 and the connection (connection p2) of the second mounting member 420 with the fuel cell module 100 is larger than the distance da2 between the connection (connection p3) of the third mounting member 430 with the fourth mounting member 440 and the connection (connection p4) of the fourth mounting member 440 with the fuel cell module 100. In place of such a difference in the distance between the connections or in addition to such a difference in the distance between the connections, the rigidity of the rear side mounting portion 401 may be made lower than the rigidity of the front side mounting portion 402 in any of aspects described below.

According to a first aspect, the rigidity of the first mounting member 410 may be made lower than the rigidity of the third mounting member 430. For example, the rigidity may be regulated by adjusting the thickness of the housing of at least one of the first mounting member 410 and the third mounting member 430. Decreasing the thickness decreases the rigidity. In another example, the rigidity may be regulated by changing the type of the material used for the housing. In another example, the rubber member filled in the housing may be made of foamed rubber, and the rigidity may be regulated by changing the amount of holes per unit volume (hole volume). Increasing the amount of holes per unit volume (hole volume) decreases the rigidity.

According to a second aspect, the rigidity of the second mounting member 420 may be made lower than the rigidity of the fourth mounting member 440. In the respective embodiments described above, the second mounting member 420 is configured to have the lower rigidity than the rigidity of the fourth mounting member 440. Such a difference in rigidity may be provided by another method. For example, the thickness of the second mounting member 420 may be made smaller than the thickness of the fourth mounting member 440, while the second mounting member 420 and the fourth mounting member 440 are formed in similar shapes. In another example, while the second mounting member 420 and the fourth mounting member 440 are formed in similar shapes and in similar thicknesses, the rigidity of the second mounting member 420 may be made relatively lower than the rigidity of the fourth mounting member 440 by providing a rib in part of the fourth mounting member 440 or by providing a through hole in part of the second mounting member 420.

According to a third aspect, the rigidity of the rear side mounting portion 401 may be made lower than the rigidity of the front side mounting portion 402 by using a bolt in a relatively low strength class in JIS (Japanese Industrial Standards) strength for the bolt 321 of the rear side connecting member 320 and using a bolt in a relatively high strength class for the bolt 341 of the front side connecting member 340.

When any of the first to the third aspects of this modification described above is employed, the configuration may have no difference in the distance between the connections. The distance between the connections may be equal to zero when being viewed in the vertical direction.

E2. Modification 2

In the respective embodiments described above, the fuel cell module 100 is mounted to the suspension member 550. The fuel cell module 100 may be not necessarily mounted to the suspension member 550 but may be mounted to any other member of the vehicle body frame. For example, the fuel cell module 100 may be mounted indirectly to a side member or a cross member.

E3. Modification 3

In the respective embodiments described above, the second chamber 520 is configured to be extended in the vehicle longitudinal direction. The present disclosure is, however, not necessarily limited to this configuration. For example, the second chamber 520 may be extended in the vehicle width direction LH. In another example, the second chamber 520 may be configured as a space extended in both the vehicle longitudinal direction and in the vehicle width direction LH. The tank 20 placed in the second chamber 520 may be placed in any orientation. Part of the forward direction FD-side portion of the tank 20 may be placed in the first chamber 510. The first chamber 510 and the second chamber 520 may not be parted from each other but may be configured as one integral chamber.

E4. Modification 4

The configuration of the fuel cell vehicle 500 according to the embodiment is only illustrative and may be changed and modified in any of various ways. For example, the numbers of the rear side mounting portions 401 and the front side mounting portions 402 or 402*a* may not be necessarily limited to 2 but may be any numbers. The case 130 may be omitted from the fuel cell module 100. The fuel cell vehicle 500 may be equipped with an internal combustion engine such as gasoline engine as the power source, in addition to the motor M. The fuel cell module 100 may not be necessarily arranged to be inclined downward toward the tank 20 in the vehicle longitudinal direction but may be arranged horizontally.

E5. Modification 5

In the respective embodiments described above, in the event of a collision, the rearward direction RD-side of the suspension member 550 or 550*a* stays at the position. According to a modification, however, the rearward direction RD-side of the suspension member 550 or 550*a* may be configured to be moved upward alike the forward direction FD-side or to be moved downward. This modified configuration causes the front portion of suspension member 550 or 550*a* to be moved upward in the event of a collision and accordingly has similar advantageous effects to those of the above embodiments.

The disclosure is not limited to any of the embodiments, the examples and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a fuel cell vehicle. This fuel cell vehicle may comprise a fuel cell module including a fuel cell stack, a vehicle body frame that the fuel cell module is mounted to, a plurality of mounting portions configured to mount the fuel cell module to the vehicle body frame, the plurality of mounting portions including a front side mounting portion configured to mount a front side of the fuel cell module in a vehicle longitudinal direction of the fuel cell vehicle to the vehicle body frame, and a rear side mounting portion configured to mount a rear side of the fuel cell module in the vehicle longitudinal direction to the vehicle body frame, and a tank placed on a rear side of the fuel cell module in the vehicle longitudinal direction and configured to store a gas that is to be supplied to the fuel cell stack. A front portion of the vehicle body frame that the front side mounting portion is attached to may be configured to be movable upward in a vehicle height direction when a load is applied in the vehicle longitudinal direction. The rear side mounting portion may be configured to be more easily breakable, compared with the front side mounting portion, when the load is applied in the vehicle longitudinal direction.

In the fuel cell vehicle of this aspect, when a load is applied in the vehicle longitudinal direction in the event of a collision, the front portion of the vehicle body frame is moved upward in the vehicle height direction. The rear side mounting portion is configured to be more easily breakable than the front side mounting portion. The rear side mounting portion is broken, so as to move the fuel cell module upward along with the front portion of the vehicle body frame. Even when the tank placed on the rear side of the fuel cell module is moved forward in the vehicle longitudinal direction by the inertial force, this configuration suppresses a collision of the tank with the fuel cell module.

(2) In the fuel cell vehicle of the above aspect, the rear side mounting portion may comprise a first mounting member connected with the vehicle body frame and a second mounting member connected with the first mounting member and with the fuel cell module. A connection of the first mounting member with the second mounting member and a connection of the second mounting member with the fuel cell module may be arranged to be away from each other in a vertical direction. In the fuel cell vehicle of this aspect, the connection of the first mounting member with the second mounting member and the connection of the second mounting member with the fuel cell module are arranged to be away from each other when being viewed in the vertical direction. When the second mounting member connected with the fuel cell module is going to move upward along with the upward motion of the front portion of the vehicle body frame in the event of a collision, this configuration generates a large moment between the connection of the first mounting member with the second mounting member and the connection of the second mounting member with the fuel cell module, i.e., in the second mounting member and thereby makes it easier to break the second mounting member.

(3) In the fuel cell vehicle of the above aspect, the front side mounting portion may comprise a third mounting member connected with the vehicle body frame and a fourth mounting member connected with the third mounting member and with the fuel cell module. A connection of the third mounting member with the fourth mounting member and a connection of the fourth mounting member with the fuel cell module may be arranged to be away from each other in the vertical direction. A distance between the connection of the first mounting member with the second mounting member and the connection of the second mounting member with the fuel cell module may be larger than a distance between the connection of the third mounting member with the fourth mounting member and the connection of the fourth mounting member with the fuel cell module. In the fuel cell vehicle of this aspect, the distance between the connection of the first mounting member with the second mounting member and the connection of the second mounting member with the fuel cell module is larger than the distance between the connection of the third mounting member with the fourth mounting member and the connection of the fourth mounting member with the fuel cell module. In the event of a collision, this configuration generates a larger moment in the second mounting member than a moment generated in the third mounting member and thereby makes it easier to break the second mounting member.

(4) In the fuel cell vehicle of the above aspect, the rear side mounting portion may comprise a first mounting member connected with the vehicle body frame and a second mounting member connected with the first mounting member and with the fuel cell module. The front side mounting portion may comprise a third mounting member connected with the vehicle body frame and a fourth mounting member connected with the third mounting member and with the fuel cell module. The second mounting member may have a rigidity lower than a rigidity of the fourth mounting member. In the fuel cell vehicle of this aspect, the rigidity of the second mounting member is lower than the rigidity of the fourth mounting member. In the event of a collision, this configuration causes the second mounting member to be more easily breakable, compared with the fourth mounting member.

(5) In the fuel cell vehicle of the above aspect, the rear side mounting portion may comprise a first mounting member connected with the vehicle body frame and a second mounting member connected with the first mounting member and with the fuel cell module. The front side mounting portion may comprise a third mounting member connected with the vehicle body frame and a fourth mounting member connected with the third mounting member and with the fuel cell module. The first mounting member may have a rigidity lower than a rigidity of the third mounting member. In the fuel cell vehicle of this aspect, the rigidity of the first mounting member is lower than the rigidity of the third mounting member. In the event of a collision, this configuration causes the first mounting member to be more easily breakable, compared with the third mounting member.

(6) In the fuel cell vehicle of the above aspect, the fuel cell module may further include a plate-like supporting frame configured to support the fuel cell stack from below in a vertical direction. The rear side mounting portion may comprise a first mounting member connected with the vehicle body frame and a second mounting member connected with the first mounting member and with the supporting frame. The front side mounting portion may comprise a third mounting member connected with the vehicle body frame and a fourth mounting member connected with the third mounting member and with the supporting frame. A portion of the supporting frame connected with the second mounting member may have a rigidity lower than a rigidity of a portion of the supporting frame connected with the fourth mounting member. In the fuel cell vehicle of this aspect, the rigidity of the portion of the supporting frame connected with the second mounting member is lower than the rigidity of the portion of the supporting frame connected with the fourth mounting member. In the event of a collision, this configuration causes the portion of the supporting frame connected with the second mounting member to be more easily breakable, compared with the portion of the supporting frame connected with the fourth mounting member.

(7) In the fuel cell vehicle of the above aspect, the fuel cell module may further include a plate-like supporting frame configured to support the fuel cell stack from below in a vertical direction. The rear side mounting portion may comprise a first mounting member connected with the vehicle body frame, a second mounting member connected with the first mounting member and with the supporting frame and a rear side connecting member configured to connect the second mounting member with the supporting frame. The front side mounting portion may comprise a third mounting member connected with the vehicle body frame, a fourth mounting member connected with the third mounting member and with the supporting frame and a front side connecting member configured to connect the fourth mounting member with the supporting frame. A contact area between the rear side connecting member and the supporting frame may be smaller than a contact area between the front side connecting member and the supporting frame. In the fuel cell vehicle of this aspect, the contact area between the rear side connecting member and the supporting frame is smaller than the contact area between the front side connecting member and the supporting frame. When a load is applied to a connected portion of the rear side connecting member with the supporting frame in the event of a collision, this configuration makes it easier to break the connected portion.

(8) In the fuel cell vehicle of the above aspect, the fuel cell module may further include a plate-like supporting frame configured to support the fuel cell stack from below in a vertical direction. The rear side mounting portion may comprise a first mounting member connected with the vehicle body frame, a second mounting member connected with the first mounting member and with the supporting frame and a rear side connecting member configured to connect the second mounting member with the supporting frame. The front side mounting portion may comprise a third mounting member connected with the vehicle body frame, a fourth mounting member connected with the third mounting member and with the supporting frame and a front side connecting member configured to connect the fourth mounting member with the supporting frame. The rear side connecting member may have a rigidity lower than a rigidity of the front side connecting member. In the fuel cell vehicle of this aspect, the rigidity of the rear side connecting member is lower than the rigidity of the front side connecting member. This configuration makes it easier to break the rear side connecting member when a load is applied in the event of a collision.

The disclosure may be implemented by various aspects other than those described above, for example, a manufacturing method of the fuel cell vehicle, a method of fixing a fuel cell module to a vehicle body frame in the fuel cell vehicle, and a method of moving a fuel cell module in the event of a collision in the fuel cell vehicle equipped with the fuel cell module.

What is claimed is:

1. A fuel cell vehicle, comprising:
   a fuel cell module including a fuel cell stack;
   a vehicle body frame that the fuel cell module is mounted to;
   a plurality of mounting portions configured to mount the fuel cell module to the vehicle body frame, the plurality of mounting portions including a front side mounting portion configured to mount a front side of the fuel cell module in a vehicle longitudinal direction of the fuel cell vehicle to the vehicle body frame, and a rear side mounting portion configured to mount a rear side of the fuel cell module in the vehicle longitudinal direction to the vehicle body frame; and
   a tank placed on a rear side of the fuel cell module in the vehicle longitudinal direction and configured to store a gas that is to be supplied to the fuel cell stack, wherein
   a front portion of the vehicle body frame that the front side mounting portion is attached to is configured to be movable upward in a vehicle height direction when a load is applied in the vehicle longitudinal direction, and
   the rear side mounting portion is configured to be more easily breakable, compared with the front side mounting portion, when the load is applied in the vehicle longitudinal direction.

2. The fuel cell vehicle according to claim 1, wherein the rear side mounting portion comprises:
   a first mounting member connected with the vehicle body frame; and
   a second mounting member connected with the first mounting member and with the fuel cell module,
   a connection of the first mounting member with the second mounting member and a connection of the second mounting member with the fuel cell module are arranged to be away from each other in a vertical direction.

3. The fuel cell vehicle according to claim 2, wherein the front side mounting portion comprises:
   a third mounting member connected with the vehicle body frame; and
   a fourth mounting member connected with the third mounting member and with the fuel cell module,
   a connection of the third mounting member with the fourth mounting member and a connection of the fourth mounting member with the fuel cell module are arranged to be away from each other in the vertical direction, and
   a distance between the connection of the first mounting member with the second mounting member and the connection of the second mounting member with the fuel cell module is larger than a distance between the connection of the third mounting member with the fourth mounting member and the connection of the fourth mounting member with the fuel cell module.

4. The fuel cell vehicle according to claim 1, wherein the rear side mounting portion comprises:
   a first mounting member connected with the vehicle body frame; and
   a second mounting member connected with the first mounting member and with the fuel cell module,
   the front side mounting portion comprises:
   a third mounting member connected with the vehicle body frame; and
   a fourth mounting member connected with the third mounting member and with the fuel cell module, and
   the second mounting member has a rigidity lower than a rigidity of the fourth mounting member.

5. The fuel cell vehicle according to claim 1, wherein the rear side mounting portion comprises:

a first mounting member connected with the vehicle body frame; and
a second mounting member connected with the first mounting member and with the fuel cell module,
the front side mounting portion comprises:
a third mounting member connected with the vehicle body frame; and
a fourth mounting member connected with the third mounting member and with the fuel cell module, and
the first mounting member has a rigidity lower than a rigidity of the third mounting member.

6. The fuel cell vehicle according to claim 1, wherein
the fuel cell module further includes a plate-like supporting frame configured to support the fuel cell stack from below in a vertical direction,
the rear side mounting portion comprises:
a first mounting member connected with the vehicle body frame; and
a second mounting member connected with the first mounting member and with the supporting frame,
the front side mounting portion comprises:
a third mounting member connected with the vehicle body frame; and
a fourth mounting member connected with the third mounting member and with the supporting frame, and
a portion of the supporting frame connected with the second mounting member has a rigidity lower than a rigidity of a portion of the supporting frame connected with the fourth mounting member.

7. The fuel cell vehicle according to claim 1, wherein
the fuel cell module further includes a plate-like supporting frame configured to support the fuel cell stack from below in a vertical direction,
the rear side mounting portion comprises:
a first mounting member connected with the vehicle body frame;
a second mounting member connected with the first mounting member and with the supporting frame; and
a rear side connecting member configured to connect the second mounting member with the supporting frame,
the front side mounting portion comprises:
a third mounting member connected with the vehicle body frame;
a fourth mounting member connected with the third mounting member and with the supporting frame; and
a front side connecting member configured to connect the fourth mounting member with the supporting frame, and
a contact area between the rear side connecting member and the supporting frame is smaller than a contact area between the front side connecting member and the supporting frame.

8. The fuel cell vehicle according to claim 1, wherein
the fuel cell module further includes a plate-like supporting frame configured to support the fuel cell stack from below in a vertical direction,
the rear side mounting portion comprises:
a first mounting member connected with the vehicle body frame;
a second mounting member connected with the first mounting member and with the supporting frame; and
a rear side connecting member configured to connect the second mounting member with the supporting frame,
the front side mounting portion comprises:
a third mounting member connected with the vehicle body frame;
a fourth mounting member connected with the third mounting member and with the supporting frame; and
a front side connecting member configured to connect the fourth mounting member with the supporting frame, and
the rear side connecting member has a rigidity lower than a rigidity of the front side connecting member.

* * * * *